(12) United States Patent
Goodman et al.

(10) Patent No.: US 10,033,811 B2
(45) Date of Patent: *Jul. 24, 2018

(54) MATCHING STORAGE RESOURCE PACKS TO STORAGE SERVICES

(71) Applicant: INTERNATIONAL BUSINESS MACHINES CORPORATION, Armonk, NY (US)

(72) Inventors: Daniel I. Goodman, Beit Shemesh (IL); Ran Harel, Kfar-Saba (IL); Rivka M. Matosevich, Zichron-Ya'acov (IL); Orit Nissan-Messing, Hod HaSharon (IL); Yossi Siles, Tel-Mond (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 14/155,146

(22) Filed: Jan. 14, 2014

(65) Prior Publication Data

US 2015/0201019 A1   Jul. 16, 2015

(51) Int. Cl.
*G06F 15/16* (2006.01)
*H04L 29/08* (2006.01)

(52) U.S. Cl.
CPC .... *H04L 67/1097* (2013.01); *H04L 29/08549* (2013.01)

(58) Field of Classification Search
None
See application file for complete search history.

(56) References Cited

U.S. PATENT DOCUMENTS

| 7,065,616 B2 | 6/2006 | Gajjar et al. |
| 7,089,381 B2 | 8/2006 | Horn et al. |
| 7,376,786 B2 | 5/2008 | Williams |

(Continued)

OTHER PUBLICATIONS

Kang et al., Virtual Allocation: A Scheme for Flexible Storage Allocation, Oct. 13, 2004, 6 pages, Proceedings of the OASIS workshop in conjunction with ASPLOS, Association for Computing Machinery, Washington DC, Texas A&M University, Boston, MA.

(Continued)

*Primary Examiner* — Phyllis A Book
(74) *Attorney, Agent, or Firm* — Griffiths & Seaton PLLC

(57) ABSTRACT

Methods, apparatus and computer program products implement embodiments of the present invention that include receiving, by a first computer in communication with a storage system, multiple resource packs, each of the resource packs including a plurality of attributes for storage resources on the storage system. Upon the first computer receiving a request from a second computer for a storage service, one or more of the received resource packs are identified that have respective attributes matching the storage service, a given identified resource pack is selected and the given identified resource pack is conveyed to the second computer. In some embodiments, the given identified resource pack can be conveyed by conveying an allocation request to the storage system for a portion of the given identified resource pack, and in response to the request, the storage system can allocate the requested portion of the given identified resource pack to the second computer.

17 Claims, 3 Drawing Sheets

(56) References Cited

U.S. PATENT DOCUMENTS

| | | |
|---|---|---|
| 7,657,613 B1 | 2/2010 | Hanson et al. |
| 7,797,468 B2 | 9/2010 | Shin et al. |
| 7,945,640 B1 | 5/2011 | Vantine |
| 8,156,306 B1* | 4/2012 | Raizen ............... G06F 3/0608 707/813 |
| 8,341,119 B1 | 12/2012 | Roussos et al. |
| 8,402,118 B2 | 3/2013 | Finnegan et al. |
| 8,478,845 B2 | 7/2013 | Agarwala et al. |
| 2006/0265521 A1* | 11/2006 | Boyd ................ G06F 3/0605 710/9 |
| 2007/0233868 A1 | 10/2007 | Tyrell et al. |
| 2008/0313414 A1 | 12/2008 | Shackelford |
| 2009/0173780 A1* | 7/2009 | Ramamoorthy ..... G06Q 10/063 235/376 |
| 2009/0240880 A1 | 9/2009 | Kawaguchi |
| 2010/0138605 A1 | 6/2010 | Kazar et al. |
| 2010/0306467 A1 | 12/2010 | Pruthi et al. |
| 2011/0022642 A1 | 1/2011 | Demilo et al. |
| 2011/0131443 A1 | 6/2011 | Laor et al. |
| 2012/0198073 A1 | 8/2012 | Srikanth et al. |
| 2012/0198190 A1 | 8/2012 | Hart et al. |
| 2012/0246318 A1* | 9/2012 | Mohammed .......... G06F 9/5061 709/226 |
| 2013/0054888 A1* | 2/2013 | Bhat ................... G06F 3/0604 711/114 |
| 2013/0067164 A1 | 3/2013 | Velayudhan et al. |
| 2013/0111471 A1 | 5/2013 | Chandrasekaran |
| 2013/0117448 A1 | 5/2013 | Nahum et al. |
| 2013/0246922 A1 | 9/2013 | Doerr et al. |
| 2015/0378613 A1* | 12/2015 | Koseki ................ G06F 3/0608 711/103 |

OTHER PUBLICATIONS

A System and Method for Providing Meta-data Model Based Distributed Data, Feb. 3, 2012.
Method and System for Extracting Meta-data for Interactions over Collaborative Applications, Aug. 26, 2010.
Papazoglou et al., "Blueprinting the cloud." pp. 74-79, IEEE 15.6 (2011), Internet Computing.

* cited by examiner

MATCHING STORAGE RESOURCE PACKS TO STORAGE SERVICES

CROSS-REFERENCE TO RELATED APPLICATIONS

This application is related to U.S. Patent Application titled "Storage Resource Pack Management", filed on even date with the present application, and which is incorporated herein by reference.

FIELD OF THE INVENTION

The present invention relates generally to data storage, and specifically to matching storage resource packs to requests for storage services received from client computers in cloud computing environments.

BACKGROUND

In cloud computing environments, infrastructure as a service (also known as IaaS) comprises a standardized, highly automated offering, where computing resources are owned and hosted by a service provider, and offered to customers on demand. In an IaaS model, the service provider delivers the underlying infrastructure, including network, storage, compute resources and virtualization technology.

The description above is presented as a general overview of related art in this field and should not be construed as an admission that any of the information it contains constitutes prior art against the present patent application.

SUMMARY

There is provided, in accordance with an embodiment of the present invention a method, including receiving, by a first computer in communication with a storage system, multiple resource packs, each of the resource packs including a plurality of attributes for storage resources on the storage system, receiving, by the first computer, a request from a second computer for a storage service, identifying one or more of the received resource packs having respective attributes matching the storage service, selecting a given identified resource pack, and conveying the given identified resource pack to the second computer.

There is also provided, in accordance with an embodiment of the present invention a storage facility, including a storage system having storage resources, and a first computer configured to receive, from the storage system, multiple resource packs, each of the resource packs including a plurality of attributes for the storage resources, to receive, from a second computer, a request for a storage service, to identify one or more of the received resource packs having respective attributes matching the storage service, to select a given identified resource pack, and to convey the given identified resource pack to the second computer.

There is further provided, in accordance with an embodiment of the present invention a computer program product, the computer program product including a non-transitory computer readable storage medium having computer readable program code embodied therewith, the computer readable program code including computer readable program code configured to receive, from a storage system, multiple resource packs, each of the resource packs including a plurality of attributes for storage resources on the storage system, computer readable program code configured to receive, from a client computer, a request for a storage service, computer readable program code configured to identify one or more of the received resource packs having respective attributes matching the storage service, computer readable program code configured to select a given identified resource pack, and computer readable program code configured to conveying the given identified resource pack to the client computer.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for matching a storage service request to one or more storage resource packs in a storage facility configured to deliver infrastructure as a service (IaaS) solutions. In embodiments of the present invention, the service may comprise storage resources that can be provided to a cloud computing environment. As described hereinbelow, the storage facility may comprise a storage system in communication with a storage allocation server configured to match a storage service to one or more resource packs.

In embodiments described herein, the storage allocation server (also referred to herein as a first computer) can be initialized by receiving, from the storage system, a multiple of resource packs, each of the resource packs comprising a plurality of attributes for storage resources on the storage system. Subsequent to being initialized, upon the storage allocation server receiving a request for a storage service request from a given client computer (also referred to herein as a second computer) in a cloud computing environment, the storage allocation server can identify one or more of the received resource packs having respective attributes matching the storage service, select a given identified resource pack, and convey the selected resource pack to the given client.

Figure 1:
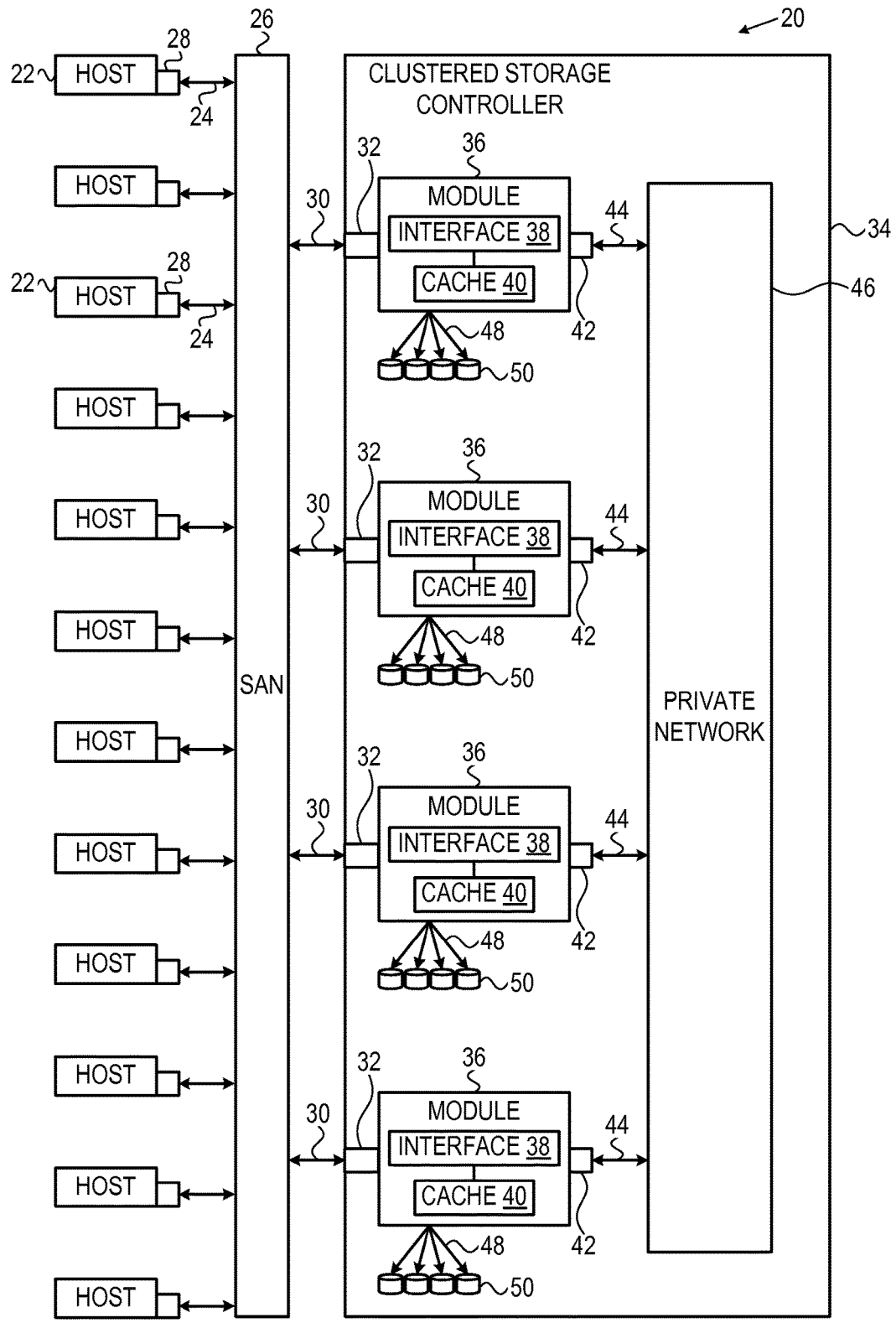
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
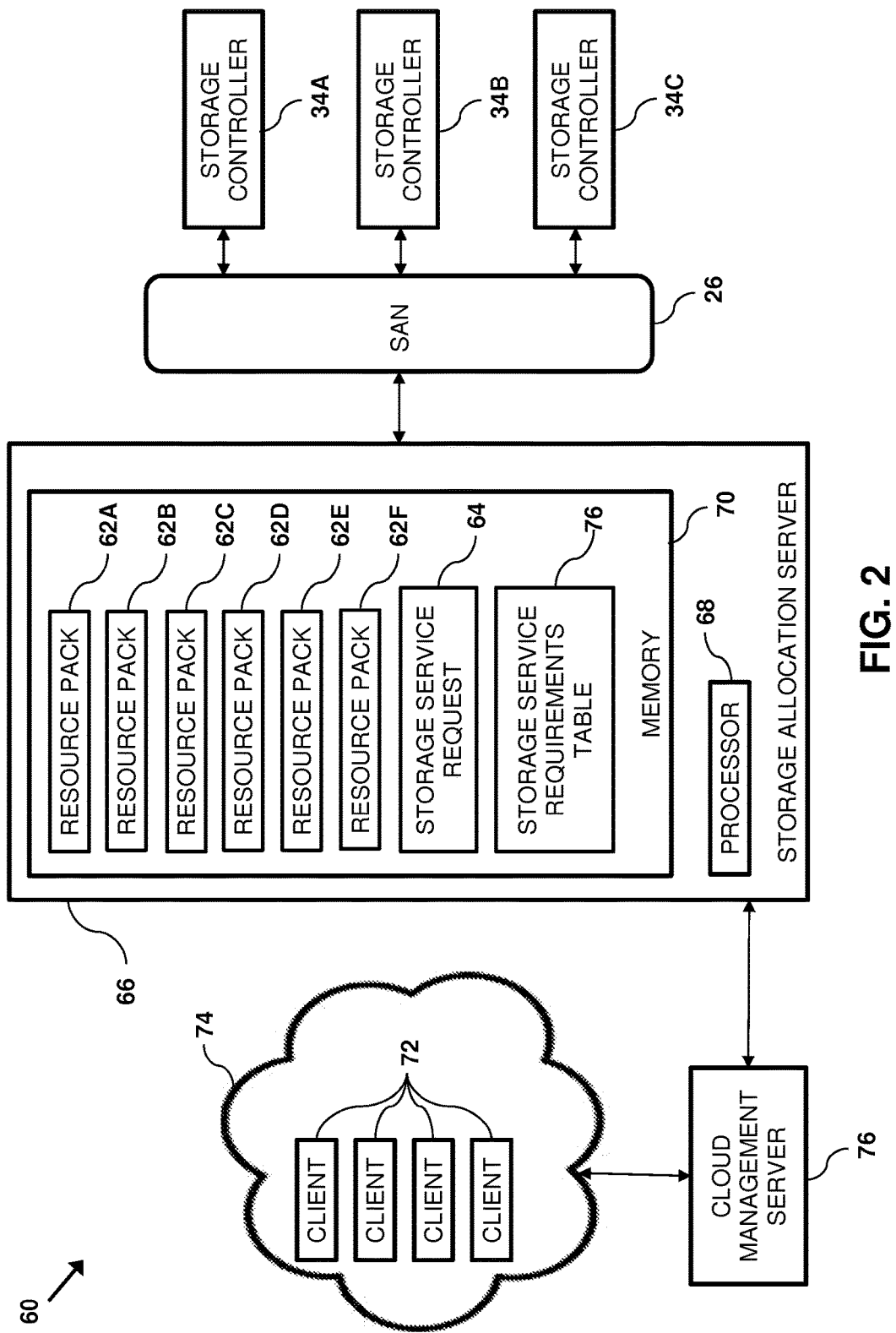
FIG. 2 is a block diagram of a storage facility configured to match storage resource packs to storage service requests, in accordance with an embodiment of the present invention.

FIG. 2 is a block diagram showing a storage facility 60 that is configured to match one or more storage resource packs to a storage service request 64, in accordance with an embodiment of the present invention. Resource packs 62 are described in more detail in U.S. Patent Application "Storage Resource Pack Management" referenced above.

Storage facility 60 comprises a storage allocation server 66 in communication with multiple storage controllers 34 via SAN 26, and a cloud management server 76 that provides an interface between the storage facility and clients 72 that comprise front-end computing platforms in a cloud computing environment 74. Storage allocation server 66 comprises a processor 68 and a memory 70. In the configuration shown in FIG. 2, storage controllers 34 can be differentiated by appending a letter to the identifying numeral, so that the storage controllers comprise storage controllers 34A-34C.

As explained herein below, processor 68 receives storage service request 64 from a given cloud client 72 in cloud computing environment 74, stores the received storage service request to memory 70, and matches the received storage service request to one or more resource packs 62 that were previously received from storage controllers 34 and that are stored in the memory. In the configuration shown in FIG. 2, resource packs 62 in memory 70 can be differentiated by appending a letter to the identifying numeral, so that the resource packs comprise resource packs 62A-62F. Each of the resource packs references storage resources on a specific storage controller 34. For example, resource packs 62A and 62B can reference storage resources on storage controller 34A, resource packs 62C and 62D can reference storage resources on storage controller 34AB, and resource packs 62E and 62F can reference storage resources on storage controller 34C.

Memory 70 is also configured to store a storage service requirements table, whose functionality is described in detail herein below.

Processor 68 typically comprises a general-purpose computer, which are programmed in software to carry out the functions described herein. The software may be downloaded to storage allocation server 66 in electronic form, over a network, for example, or it may be provided on non-transitory tangible media, such as optical, magnetic or electronic memory media. Alternatively, some or all of the functions of processor 68 may be carried out by dedicated or programmable digital hardware components, or using a combination of hardware and software elements.

Storage service request 64 comprises a set of storage requirements that is needed to satisfy a specific business requirement, at any level of granularity. In some embodiments, the storage request can reference specific storage requirement. For example, a given storage service can be defined for "Gold level test services storage", or "Silver level test services storage", and the storage service can include requirements such as:

A required available storage capacity.

A required number of average input/output operations per second (IOPS).

A vendor name for a given storage controller 34.

A model number for a given storage controller.

A storage pool type (e.g., thick or thin).

An indicator whether or not data compression is required.

A chargeback (i.e., a storage cost) range.

In alternative embodiments, the storage request can reference a specific software application such as an operating system, a hypervisor, a database or an email server. In operation, each entry (not shown) in table 76 can store pre-defined storage requirements (also referred to herein as application parameters) for a specific application or a specific level of service. For example, table 76 can store respective entries comprising storage requirements for a database, an email server, a gold level service, and a silver level service, and upon processor 68 receiving a request from a given client 72 for an email server, the processor can access table 76 to translate the request into a set of storage requirements.

While embodiments herein describe storage allocation server 66 matching defining and managing storage packs 62, defining and managing the storage packs by any other computer in storage controllers 34 or facility 60 is considered to be within the spirit and scope of the present invention. For example, the storage packs can be defined and managed by a given host computer 22, or by a given module 36 in a given storage controller 34.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Resource Pack Matching

Figure 3:
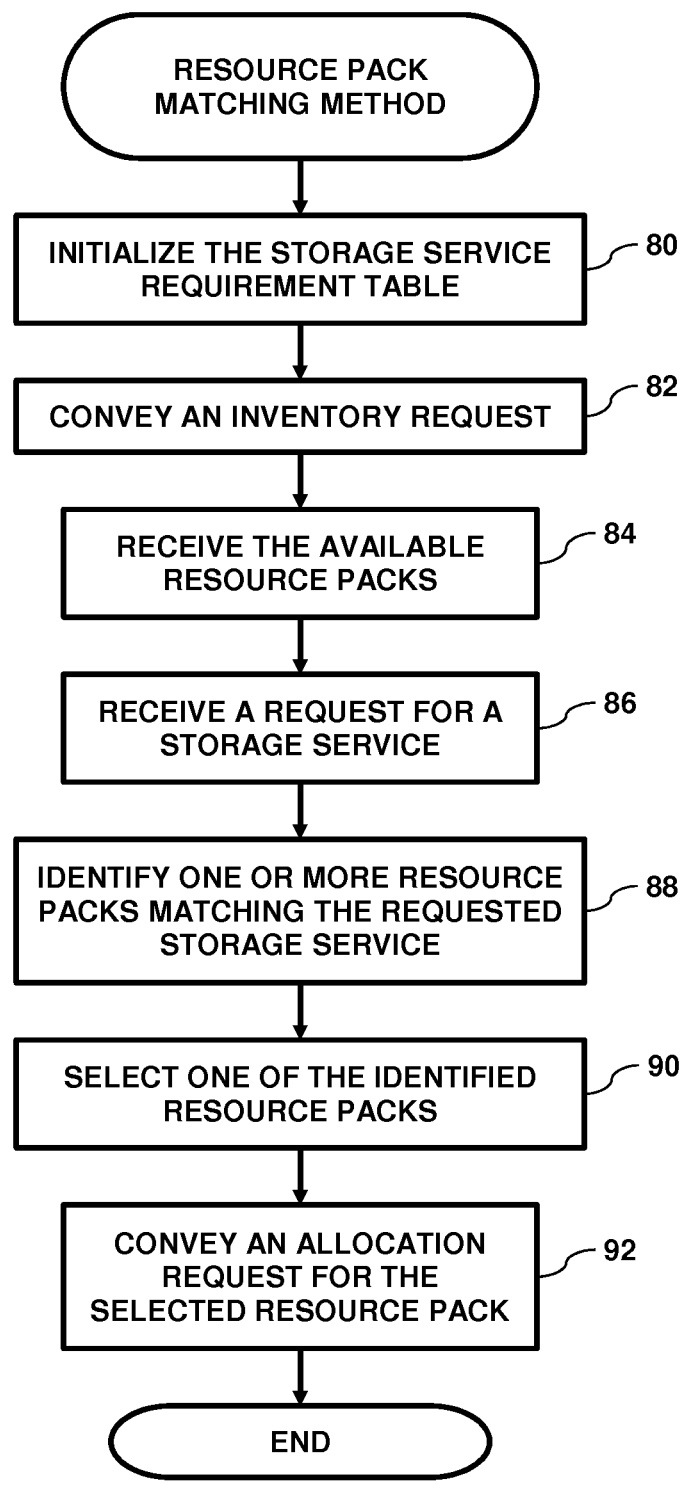
FIG. 3 is a flow diagram that schematically illustrates a method of matching a storage service to one or more storage resource packs, in accordance an embodiment of the present invention.

FIG. 3 is a flow diagram that schematically illustrates a method of matching storage service request 64 to one or more resource packs 62, in accordance with an embodiment of the present invention. In an initialization step 80, processor 68 initializes storage service requirements table 76, thereby defining a set of storage services that can be matched to one or more resource packs 62.

In some embodiments, each resource pack 62 can be associated with a respective resource pack type, and to initialize table 76, processor 68 can create entries in the table that associate applications with the resource packs. For example, processor 68 can create a given entry comprising an association between a given resource pack type with an email server application.

In a first request step 82, processor 68 conveys a resource pack inventory request to each storage controller 34. In response to the request, storage controllers 34 conveys resource packs 62 to server 66, and processor 68 receives the conveyed resource packs in a first receive step 84. Processing resource pack inventory requests is described in more detail in U.S. Patent Application "Storage Resource Pack Management" referenced above.

In a second receive step 86, processor 68 receives, from a given client 72, storage service request 64, and in an identification step 88, the processor identifies one or more resource packs 62 whose attributes match the requirements of storage service request 64. To identify one or more resource packs 62 that match request 64, processor 68 can locate an entry in storage service requirements table 76 matching the storage service request, and identify one or more resource packs whose respective attributes can fulfill the requirements of the storage service request. In other words, processor 68 can identify the one or more resource packs whose respective attributes are greater than or equal to the one or more storage requirements of the storage service request.

In embodiments where the storage resource request has an associated application and where each resource pack 62 has a respective resource pack type associated with an application (as described supra), processor 28 can identify the one or more resource packs in step 88 by identifying the one or more resource packs whose respective resource pack types match the application associated with storage resource request 64.

In a select step 90, processor 68 selects a given identified resource pack using defined business rules. In an alternative embodiment, processor 68 can select a given identified resource pack based on input received from a systems administrator (not shown). As described supra, the given identified resource pack comprises storage resources on a given storage controller 34.

Finally, in an allocation step 92, processor 68 conveys the given identified resource to the given client by conveying, to the given storage controller 34, an allocation request to allocate a portion of the given identified resource pack to the given client. In response to the allocation request, storage system 34 allocates the requested portion of the given identified resource pack to the second computer, and the method ends. Allocating a given resource pack 62 to a given client 72 is described in more detail in U.S. Patent Application "Storage Resource Pack Management" referenced above.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   receiving, by a first computer in communication with a storage system and prior to receiving a request for a storage service from a second computer, multiple resource packs upon the first computer conveying a resource pack inventory request to the storage system, each of the resource packs comprising a plurality of attributes for storage resources on the storage system such that a particular resource pack references a set of storage resources including processors, memory devices, and storage devices defined to comprise the particular resource pack; wherein each of the multiple resource packs are associated with a resource pack type, the resource pack types initialized as entries into a table within the first computer and each resource type initialized as entries into the table associated with a certain application type;
   receiving, by the first computer, the request from the second computer for the storage service, the storage service request comprising a set of storage requirements needed which include at least a required available storage capacity, a storage pool type, an indicator as to whether data compression is required, and a required number of average number of input/output operations per second (IOPS) supported by the storage system;
identifying one or more of the received resource packs having respective attributes matching the storage service and the certain application type requested;
selecting a given identified resource pack; and
conveying the given identified resource pack to the second computer by conveying, by the first computer, an allocation request to the storage system for a portion of the given identified resource pack, and allocating, by the storage system the requested portion of the given identified resource pack to the second computer.

2. The method according to claim 1, wherein the second computer comprises a client computer in a cloud computing environment.

3. The method according to claim 1, and comprising prior to receiving the multiple resource packs, conveying, by the first computer, the resource pack inventory request to the storage system, and conveying, by the storage system, the multiple resource packs to the first computer in response to the resource pack request.

4. The method according to claim 1, wherein the storage service is selected from a list consisting of application parameters and storage requirements.

5. The method according to claim 4, and comprising prior to receiving the request, associating, by the first computer, the application with the one or more resource packs, and wherein identifying the one or more resource packs comprises identifying the one or more resource packs associated with the application.

6. The method according to claim 4, wherein identifying the one or more resource packs comprises identifying the one or more resource packs whose respective attributes can fulfill the one or more storage requirements.

7. A storage facility, comprising:
a storage system having storage resources; and
a first computer configured:
to receive, from the storage system and prior to receiving a request for a storage service from a second computer, multiple resource packs upon the first computer conveying a resource pack inventory request to the storage system, each of the resource packs comprising a plurality of attributes for the storage resources such that a particular resource pack references a set of storage resources including processors, memory devices, and storage devices defined to comprise the particular resource pack; wherein each of the multiple resource packs are associated with a resource pack type, the resource pack types initialized as entries into a table within the first computer and each resource type initialized as entries into the table associated with a certain application type,
to receive, from the second computer, the request for the storage service, the storage service request comprising a set of storage requirements needed which include at least a required available storage capacity, a storage pool type, an indicator as to whether data compression is required, and a required number of average number of input/output operations per second (IOPS) supported by the storage system,
to identify one or more of the received resource packs having respective attributes matching the storage service and the certain application type requested,
to select a given identified resource pack, and
to convey the given identified resource pack to the second computer by conveying, by the first computer, an allocation request to the storage system for a portion of the given identified resource pack, and allocating, by the storage system the requested portion of the given identified resource pack to the second computer.

8. The storage facility according to claim 7, wherein the second computer comprises a client computer in a cloud computing environment.

9. The storage facility according to claim 7, wherein prior to receiving the multiple resource packs, the first computer is configured to convey the resource pack inventory request to the storage system, and wherein the storage system is configured to convey the multiple resource packs to the first computer in response to the resource pack request.

10. The storage facility according to claim 7, wherein the storage service is selected from a list consisting of application parameters and storage requirements.

11. The storage facility according to claim 10, wherein prior to receiving the request, the first computer is configured to associate the application with the one or more resource packs, and wherein the first computer is configured to identify the one or more resource packs by identifying the one or more resource packs associated with the application.

12. The storage facility according to claim 10, wherein the first computer is configured to identify the one or more resource packs by identifying the one or more resource packs whose respective attributes can fulfill the one or more storage requirements.

13. A computer program product, the computer program product comprising:
a non-transitory computer readable storage medium having computer readable program code embodied therewith, the computer readable program code comprising:
computer readable program code configured to receive, from a storage system and prior to receiving a request for a storage service from a client computer, multiple resource packs upon the first computer conveying a resource pack inventory request to the storage system, each of the resource packs comprising a plurality of attributes for storage resources on the storage system such that a particular resource pack references a set of storage resources including processors, memory devices, and storage devices defined to comprise the particular resource pack; wherein each of the multiple resource packs are associated with a resource pack type, the resource pack types initialized as entries into a table within a first computer in the storage system and each resource type initialized as entries into the table associated with a certain application type;
computer readable program code configured to receive, from the client computer, the request for the storage service, the storage service request comprising a set of storage requirements needed which include at least a required available storage capacity, a storage pool type, an indicator as to whether data compression is required, and a required number of average number of input/output operations per second (IOPS) supported by the storage system;
computer readable program code configured to identify one or more of the received resource packs having respective attributes matching the storage service and the certain application type requested;
computer readable program code configured to select a given identified resource pack; and computer readable program code configured to convey the given identified resource pack to the client computer by conveying, by the first computer, an allocation request to the storage system for a portion of the given identified resource pack, and allocating, by the storage system the requested portion of the given identified resource pack to the client computer.

14. The computer program product according to claim 13, and comprising computer readable program code configured, prior to receiving the multiple resource packs, to convey the resource pack inventory request to the storage system, and computer readable program code executing on the storage system and configured to convey the multiple resource packs to the first computer in response to the resource pack request.

15. The computer program product according to claim 13, wherein the storage service is selected from a list consisting of application parameters and storage requirements.

16. The computer program product according to claim 15, and comprising computer readable program code configured, prior to receiving the request, to associate the application with the one or more resource packs, and wherein the computer readable program code is configured to identify the one or more resource packs by identifying the one or more resource packs associated with the application.

17. The computer program product according to claim 15, wherein the computer readable program code is configured to identify the one or more resource packs by identifying the one or more resource packs whose respective attributes can fulfill the one or more storage requirements.

* * * * *